(12) United States Patent
Wu

(10) Patent No.: US 12,487,407 B2
(45) Date of Patent: Dec. 2, 2025

(54) COMPACT LIGHT SPLITTING DEVICES AND METHODS

(71) Applicant: Apple Inc., Cupertino, CA (US)

(72) Inventor: Yi-Kuei Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 581 days.

(21) Appl. No.: 17/851,252

(22) Filed: Jun. 28, 2022

(65) Prior Publication Data

US 2023/0094833 A1 Mar. 30, 2023

Related U.S. Application Data

(60) Provisional application No. 63/248,236, filed on Sep. 24, 2021.

(51) Int. Cl.
*G02B 6/28* (2006.01)
*G02B 6/12* (2006.01)

(52) U.S. Cl.
CPC ........ *G02B 6/28* (2013.01); *G02B 2006/1215* (2013.01); *G02B 2006/12154* (2013.01)

(58) Field of Classification Search
CPC .............. G02B 2006/1215; G02B 2006/12154
See application file for complete search history.

(56) References Cited

U.S. PATENT DOCUMENTS

| 3,920,314 A | 11/1975 | Hiroyoshi |
| 4,796,131 A | 1/1989 | Chang |
| 4,934,775 A | 6/1990 | Koai |
| 5,044,715 A * | 9/1991 | Kawachi ............... G02F 1/3136 385/16 |
| 5,379,354 A | 1/1995 | Jenkins |

(Continued)

FOREIGN PATENT DOCUMENTS

| CN | 201177670 Y | 1/2009 |
| CN | 109445026 | 12/2020 |

(Continued)

OTHER PUBLICATIONS

Extended European search report for application EP 22192837, dated Feb. 14, 2023. (Year: 2023).*

(Continued)

*Primary Examiner* — Michael Stahl
(74) *Attorney, Agent, or Firm* — Brownstein Hyatt Farber Schreck, LLP

(57) ABSTRACT

Configurations for a light splitting device used for light splitting over an operating bandwidth of wavelengths are disclosed. The light splitting device may include a first coupler and a second coupler, where the first coupler has a first splitting power relationship and the second coupler has a second splitting power relationship and the first and second splitting power relationships are complementary to one another over the operating bandwidth of wavelengths. The light splitting device may further include a phase delay positioned between the first and second couplers. The phase delay may result in the output light having an approximately even optical power distribution across the operating bandwidth of wavelengths. In some embodiments, the first and second couplers may be directional couplers and, in other embodiments, the first and second couplers may be tapered couplers.

11 Claims, 4 Drawing Sheets

(56) References Cited

U.S. PATENT DOCUMENTS

| | | |
|---|---|---|
| 5,524,156 A | 6/1996 | Van Der Tol |
| 5,544,268 A | 8/1996 | Bischel |
| 5,586,206 A | 12/1996 | Brinkman |
| 5,647,036 A | 7/1997 | Deacon |
| 5,652,817 A | 7/1997 | Brinkman |
| 5,664,032 A | 9/1997 | Bischel |
| 5,718,989 A | 2/1998 | Aoki |
| 5,724,463 A | 3/1998 | Deacon |
| 5,790,720 A | 8/1998 | Marcuse |
| 5,799,199 A | 8/1998 | Ito et al. |
| 5,818,989 A | 10/1998 | Nakamura |
| 5,835,458 A | 11/1998 | Bischel |
| 5,911,018 A | 6/1999 | Bischel |
| 5,912,997 A | 6/1999 | Bischel |
| 5,923,801 A | 7/1999 | Werner et al. |
| 5,978,524 A | 11/1999 | Bischel |
| 6,014,390 A | 1/2000 | Joyner |
| 6,078,704 A | 6/2000 | Bischel |
| 6,118,908 A | 9/2000 | Bischel |
| 6,141,465 A | 10/2000 | Bischel |
| 6,167,169 A | 12/2000 | Brinkman |
| 6,393,185 B1 | 5/2002 | Deacon |
| 6,415,080 B1 | 7/2002 | Sappey et al. |
| 6,522,794 B1 | 2/2003 | Bischel |
| 6,643,432 B2 | 11/2003 | Bouda |
| 6,674,949 B2 | 1/2004 | Allan et al. |
| 6,842,545 B2 | 1/2005 | Lackritz et al. |
| 6,882,758 B2 | 4/2005 | Betty |
| 6,903,820 B2 | 6/2005 | Wang |
| 6,934,447 B2 | 8/2005 | Kim |
| 6,954,568 B2 | 10/2005 | Liu |
| 7,016,568 B2 | 3/2006 | Van Weerden et al. |
| 7,031,568 B2 | 4/2006 | Laming et al. |
| 7,103,247 B2 | 9/2006 | Yamazaki et al. |
| 7,149,387 B2 | 12/2006 | Balakrishnan et al. |
| 7,151,635 B2 | 12/2006 | Bidnyk et al. |
| 7,263,394 B2 | 8/2007 | Wang |
| 7,324,195 B2 | 1/2008 | Packirisamy et al. |
| 7,327,918 B2 | 2/2008 | Yamazaki et al. |
| 7,366,421 B2 | 4/2008 | Cho et al. |
| 7,421,167 B2 | 9/2008 | Charters et al. |
| 7,595,879 B2 | 9/2009 | Wang |
| 7,831,298 B1 | 11/2010 | Wang |
| 7,840,108 B2 | 11/2010 | Miyadera |
| 7,876,983 B2 | 1/2011 | Doerr |
| 7,970,458 B2 | 6/2011 | Norris et al. |
| 7,974,504 B2 | 7/2011 | Nagarajan et al. |
| 7,999,938 B2 | 8/2011 | Wang |
| 8,411,260 B1 | 4/2013 | Feng |
| 8,498,681 B2 | 7/2013 | Wang et al. |
| 9,052,447 B2 | 6/2015 | Luo et al. |
| 9,151,894 B2 | 10/2015 | Okano et al. |
| 9,176,282 B2 | 11/2015 | Pottier |
| 9,369,201 B2 | 6/2016 | Luo et al. |
| 9,395,494 B2 | 7/2016 | Krishnamurthi et al. |
| 9,557,482 B2 | 1/2017 | Oka et al. |
| 9,588,295 B2 | 3/2017 | Onawa |
| 9,678,012 B2 | 6/2017 | Rothberg et al. |
| 9,759,865 B1 | 9/2017 | Lin |
| 9,784,679 B2 | 10/2017 | Rothberg et al. |
| 9,817,296 B2 | 11/2017 | Sharkawy et al. |
| 9,869,816 B2 | 1/2018 | Ishikura et al. |
| 9,880,352 B2 | 1/2018 | Florjanczyk et al. |
| 9,977,187 B2 | 5/2018 | Shi et al. |
| 10,126,498 B1 | 11/2018 | Ma |
| 10,215,689 B2 | 2/2019 | Wang et al. |
| 10,359,571 B2 | 7/2019 | Horth |
| 10,495,813 B2 | 12/2019 | Mahgerefteh et al. |
| 10,520,672 B2 | 12/2019 | Ma et al. |
| 10,551,567 B2 | 2/2020 | Wang et al. |
| 10,578,806 B2 | 3/2020 | Lamponi et al. |
| 10,901,148 B2 | 1/2021 | Ma et al. |
| 10,935,726 B1 | 3/2021 | Lee |
| 10,976,489 B2 | 4/2021 | Jou et al. |
| 10,983,200 B1 | 4/2021 | Shen et al. |
| 11,022,522 B2 | 6/2021 | Piazza et al. |
| 11,079,542 B2 | 8/2021 | Fertig et al. |
| 11,079,547 B2 | 8/2021 | Trita |
| 11,131,809 B2 | 9/2021 | Villafranca Velasco |
| 11,231,319 B1 | 1/2022 | Tu et al. |
| 11,280,960 B2 | 3/2022 | Qi et al. |
| 11,320,720 B2 | 5/2022 | Puckett et al. |
| 11,402,581 B2 | 8/2022 | Baba |
| 11,480,731 B2 | 10/2022 | Liu et al. |
| 11,500,154 B1 | 11/2022 | Tu et al. |
| 11,506,535 B1 | 11/2022 | Tu et al. |
| 11,561,346 B2 | 1/2023 | Tu |
| 11,630,262 B2 | 4/2023 | Shin et al. |
| 11,644,619 B2 | 5/2023 | Qi et al. |
| 2003/0091265 A1 | 5/2003 | Lin et al. |
| 2003/0113066 A1 | 6/2003 | Kim |
| 2003/0133663 A1 | 7/2003 | Orignac et al. |
| 2004/0197048 A1* | 10/2004 | White ............... H04B 10/2581 385/24 |
| 2005/0031267 A1 | 2/2005 | Sumimoto |
| 2006/0002653 A1* | 1/2006 | Grunnet-Jepsen ......... G02B 6/29353 385/5 |
| 2006/0039646 A1 | 2/2006 | Nashimoto |
| 2006/0280411 A1* | 12/2006 | Nishizawa ........... G02B 6/4246 385/94 |
| 2007/0217739 A1* | 9/2007 | McGreer .............. G02B 6/2835 385/32 |
| 2008/0138008 A1 | 6/2008 | Tolstikhin et al. |
| 2008/0266639 A1 | 10/2008 | Melloni et al. |
| 2012/0002924 A1 | 1/2012 | Okayama |
| 2013/0156361 A1 | 6/2013 | Kojima et al. |
| 2014/0270620 A1 | 9/2014 | Anderson et al. |
| 2015/0104130 A1 | 4/2015 | Anderson et al. |
| 2015/0338577 A1 | 11/2015 | Shi et al. |
| 2019/0052063 A1 | 2/2019 | Tolstikhin |
| 2020/0333530 A1 | 10/2020 | Lin et al. |
| 2021/0191039 A1 | 6/2021 | Jou et al. |
| 2021/0270699 A1 | 9/2021 | Piazza et al. |
| 2022/0043207 A1 | 2/2022 | Bian |
| 2022/0091333 A1 | 3/2022 | Wu |
| 2022/0091338 A1 | 3/2022 | Tu et al. |
| 2022/0099889 A1 | 3/2022 | Arbore et al. |
| 2023/0071329 A1 | 3/2023 | Wu et al. |
| 2023/0103057 A1 | 3/2023 | Wang et al. |
| 2023/0110382 A1 | 4/2023 | Wu et al. |
| 2023/0125733 A1 | 4/2023 | Thomas et al. |
| 2023/0358964 A1 | 11/2023 | Dezfouli et al. |
| 2024/0077686 A1 | 3/2024 | Pelc et al. |
| 2024/0103224 A1 | 3/2024 | Arbore et al. |

FOREIGN PATENT DOCUMENTS

| | | |
|---|---|---|
| JP | H04204508 | 7/1992 |
| JP | H063709 | 1/1994 |
| JP | 2004246235 | 9/2004 |
| JP | 2005284256 | 10/2005 |
| JP | 2006284791 | 10/2006 |
| JP | 2007279240 | 10/2007 |
| JP | 2010223991 | 10/2010 |
| JP | 2011232674 | 11/2011 |
| JP | 2015152729 | 8/2015 |
| JP | 2015197664 | 11/2015 |
| JP | 2016148810 | 8/2016 |
| JP | 2018004692 | 1/2018 |
| KR | 10-2003-0049636 | 6/2003 |
| WO | WO 05/022223 | 11/2007 |

OTHER PUBLICATIONS

T. Murphy et al. Wavelength- and polarization-insensitive integrated directional couplers using Mach-Zehnder structures. Integrated Photonics Research, OSA Technical Digest Series (Optica Publishing Group, 1999), paper RTuA5 (https://doi.org/10.1364/IPR.1999.RTuA5) (Year: 1999).*

E. Agrell et al. Roadmap of optical communications. Journal of Optics, 18:6, 063002, May 3, 2016 (https://doi.org/10.1088/2040-8978/18/6/063002) (Year: 2016).*

(56) References Cited

OTHER PUBLICATIONS

F. Garcia Gunning et al. Key enabling technologies for optical communications at 2000 nm. Applied Optics, 57:22, E64-E70, Aug. 1, 2018 (https://doi.org/10.1364/AO.57.000E64) (Year: 2018).*

U.S. Appl. No. 17/725,418, filed Apr. 20, 2022, Wu et al.

U.S. Appl. No. 17/832,091, filed Jun. 3, 2022, Wu.

Dai et al., "Compact silicon-on-insulator-based multimode interference coupler with bilevel taper structure," Applied Optics, Optical Society of America, vol. 44, No. 24, 2005, pp. 5036-5041.

Li et al., "Compact and low-loss silicon power splitter based on inverse tapers," Optics Letters, Optical Society of America, vol. 38, No. 20, 2013, pp. 4220-4223.

Rasigade et al., "Compact wavelength-insensitive fabrication-tolerant silicon-on-insulator beam splitter," Optics Letters, Optical Society of America, vol. 35, No. 21, 2010, pp. 3700-3702.

Dai et al., "10-Channel Mode (de)multiplexer with Dual Polarizations," Laser & Photonics Reviews, vol. 12, No. 1, Nov. 17, 2017, 9 pages.

Liu et al., "Silicon Multimode Waveguide Grating Filter at 2 μm," Journal of Lightwave Technology, IEEE USA, vol. 37, No. 10, May 15, 2019, pp. 2217-2222.

U.S. Appl. No. 17/903,875, filed Sep. 6, 2022, Pelc et al.

U.S. Appl. No. 17/985,615, filed Nov. 11, 2022, Wu et al.

He et al., "Integrated Polarization Compensator for WDM Waveguide Demultiplexers," *IEEE Photonics Technology Letters* vol. 11, No. 2, Feb. 1999, pp. 224-226.

Krubhakar et al., "Design and fabrication of integrated optical 1×8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

Wang et al., "Ultra-broadband and low-loss 3 dB optical power splitter based on adiabatic silicon waveguides" (May 2016) Optics Letters 41(9) 2056-2057.

\* cited by examiner

COMPACT LIGHT SPLITTING DEVICES AND METHODS

CROSS-REFERENCE TO RELATED APPLICATIONS

This application claims the benefit under 35 U.S.C. § 119(e) of U.S. Provisional Patent Application No. 63/248,236, filed Sep. 24, 2021, the contents of which are incorporated herein by reference in their entirety.

FIELD

This disclosure relates generally to light splitting devices. More particularly, embodiments herein relate to an optical system with light couplers that are optically coupled to one another with a phase delay positioned between the light couplers.

BACKGROUND

Generally, optical systems employ multiple light inputs to measure various types of information. Some of these optical systems may output light at multiple different wavelengths. However, as the number of monitored wavelengths increase, the size, cost, and complexity of the optical system increase as well. Due to the scaling of the size of the optical system with the number of light inputs, light sources and/or wavelengths of light, the optical systems used for generating, splitting, coupling, and/or monitoring light may not be suitable for certain applications due to factors such as size, cost, and complexity. As one example, such optical systems may take up too much space to be reasonably incorporated into compact electronic devices, such as mobile phones, tablet computing devices, laptops, wearables, and the like. Additionally, existing optical systems for emitting and/or monitoring light may function over a narrow wavelength range and may not efficiently function in different or broad wavelength ranges. Accordingly, it may be desirable to employ a system that performs across a broadband wavelength range while maintaining a compact form factor for incorporation in compact electronic devices.

SUMMARY

Embodiments of the systems, devices, methods, and apparatuses described in the present disclosure are directed to a compact broadband light splitting device. Also described are systems, devices, methods, and apparatuses directed to a light splitting device that employs cascaded two-by-two directional couplers or cascaded two-by-two tapered couplers. The cascaded two-by-two directional couplers individually may be narrowband two-by-two couplers. When the two-by-two directional couplers are optically coupled to one another with a phase delay positioned on one of the arms between the two-by-two directional couplers, the directional splitting device may perform over a broader bandwidth (e.g., broadband wavelengths). Similarly, the two-by-two tapered couplers individually may be narrowband two-by-two couplers, but when optically coupled to one another with a phase delay positioned between the two-by-two tapered couplers, the tapered splitting device may function over a broader bandwidth (e.g., broadband wavelengths).

In some examples, the present disclosure describes a light splitting device. The light splitting device may include a first coupler that couples light over an operating bandwidth of wavelengths. The first coupler may include a first leg of the first coupler and a second leg of the first coupler, optically coupled to the first leg of the first coupler. The light splitting device may also include a second coupler that couples light over the operating bandwidth of wavelengths. The second coupler may include a first leg of the second coupler and a second leg of the second coupler optically coupled to the first leg of the second coupler. The light splitting device may also include a phase delay positioned between the first coupler and the second coupler. Additionally, the first coupler has a first splitting power relationship, the second coupler has a second splitting power relationship, and the first coupler and the second coupler have complementary splitting power relationships over the operating bandwidth of wavelengths In other examples, the present disclosure may include a light splitting device. The light splitting device may include a first coupler for coupling light with a first splitting power relationship between wavelengths of light and output optical power, where the first coupler includes a first leg and a second leg of the first coupler positioned so that the light couples between the second leg and the first leg. The light splitting device may include a second coupler for coupling light with a second splitting power relationship between wavelengths of light and output optical power, the second coupler including a first leg and a second leg of the second coupler positioned so that the light couples between the first leg of the second coupler and the second leg of the second coupler; and a phase delay positioned between the second leg of the first coupler and second leg of the second coupler, where the first and second splitting power relationships between the wavelengths of light and the output optical power are different from one another.

In other examples, the present disclosure may include a method for splitting light. The method may include inputting a first input light to a first coupler, outputting a first and a second output light from the first coupler, delaying a phase of the second output light, receiving the first output light and the phase delayed second output light by a second coupler, and outputting a first and a second output light from the second coupler. The first input light and the second input light inputted to the first coupler are within an operating bandwidth of wavelengths, the first coupler has a first splitting power relationship, the second coupler has a second splitting power relationship, and the first and second splitting power relationships are complementary across the operating bandwidth of wavelengths.

In addition to the example aspects and embodiments described above, further aspects and embodiments will become apparent by reference to the drawings and by study of the following description.

Figure 1:
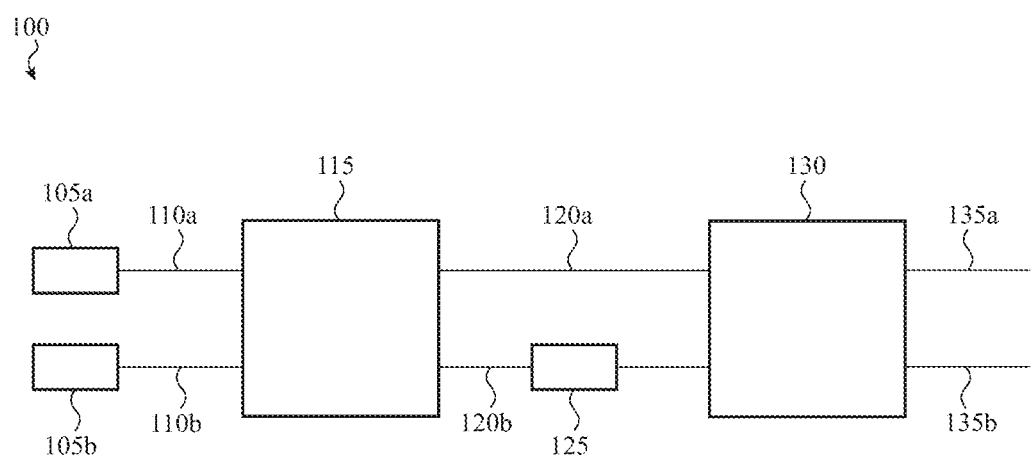
FIG. 1 is a block diagram of an example light splitting device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Additionally, two elements that are "optically coupled" to one another may allow light to pass and/or couple from one element to the other element.

As used throughout this specification, a reference number without an alpha character following the reference number can refer to one or more of the corresponding references, the group of all references, or some of the references. For example, "215" can refer to a first coupler leg 215a (e.g., first coupler leg 215a of the first coupler 215, second coupler leg 215b of the first coupler, etc.), can refer to all sections of the first coupler 215, or can refer to one or more legs of the first coupler 215 (e.g., both legs 215a and section 215b of the first coupler 215) depending on the context in which it is used.

In the following description of examples, reference is made to the accompanying drawings in which it is shown by way of illustration specific examples that can be practiced. It is to be understood that other examples can be used and structural changes can be made without departing from the scope of the various examples.

Generally, optical systems may employ multiple light inputs, where the light may be split and/or combined. Various systems may be used to split and/or combine light emitted by light inputs, but may include different components and may vary from one another in different ways, such as size, optical efficiency, cost, energy efficiency, wavelength dependence or independence, any combination thereof, and so forth. In some examples, light may be split using multiple stages in an optical system and the optical system size may increase with the number of light splitting stages. Because the light splitting devices typically scale with the number of output ports, these devices may become unreasonably large and may not be easily incorporated into the optical system.

Disclosed herein is a compact light splitting device that may split and/or combine light using a pair of two-by-two couplers that have complementary optical splitting power relationships. Specifically, the light splitting device may include a first two-by-two coupler, a second two-by-two coupler that are connected in series with a phase delay between the first and second two-by-two couplers. In one embodiment, the two-by-two couplers are directional couplers. In another embodiment, the two-by-two couplers are tapered couplers.

The light splitting devices described herein represent a compact option and may have a wider operating bandwidth than those of the underlying individual two-by-two couplers. As used herein, the "operating bandwidth" for a light splitting component refers to the range of wavelengths over which light, when introduced to an input of the light splitting component, will be split between the outputs of the light splitting component in amounts that meet one or more predetermined criteria. The predetermined criteria may be a range of acceptable light splitting ratios. For example, the acceptable range of light-splitting ratios may be ratios less than or equal to 1.2:1. In such an example, a first wavelength that is split evenly by the light splitting component (e.g., at a 1:1 ratio) would be part of the operating bandwidth, while a second wavelength that is split 60/40 between the outputs (e.g., at 1.5:1 ratio) would not be part of the operating bandwidth.

For the purpose of this application, when discussing the relative operating bandwidths between two components, it is assumed that the operating bandwidth for each component is calculated according to the same one or more criteria. When calculating the operating bandwidth for the light splitting devices described here, it should be appreciated that actual values of the one or more predetermined criteria may vary depending on the overall system needs. In some instances, the light splitting device may have tight tolerances (e.g., less than plus or minus one percent variation from the specifications) or more relaxed tolerances (e.g., less than plus or minus 10 percent variation from the specifications). Regardless of the selection of these values, the light splitting devices described herein may provide an operating bandwidth that is wider than the individual operating bandwidths of its first and second individual two-by-two couplers.

An individual two-by-two coupler may have an operating bandwidth as discussed above. The two-by-two coupler may still receive and split light at wavelengths outside of operating bandwidth, but the light will at these wavelengths be split at different splitting ratios when compared to wavelengths in the operating bandwidth. For some of these wavelengths, however, the phase delay as well as the splitting ratio for that wavelength in the other two-by-two coupler may cause the overall splitting of that wavelength of light (i.e., the splitting achieved by the overall light splitting device) to fall within the range of acceptable light splitting ratios. In this way, a particular wavelength may fall into the operating bandwidth for the light splitting device even though it doesn't fall within the operating bandwidths for one or both of the two-by-two couplers.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

These and other embodiments are discussed below with reference to FIGS. 1-4. However, those skilled in the art will readily appreciate that the detailed description given herein with respect to these Figures is for explanatory purposes only and should not be construed as limiting.

FIG. 1 is a block diagram of an example light splitting device 100 that includes light inputs 105a, 105b, a first coupler 115, a phase delay 125, and a second coupler 130. The light inputs 105a, 105b may receive light from one or more light sources (not illustrated in FIG. 1). The light splitting device 100 may generally efficiently couple light across a wider operating bandwidth even though the first coupler 115 and the second coupler 130 are designed to efficiently couple light over relatively narrow operating bandwidths. Indeed, depending on the overall design of the light splitting device (and the overall system requirements) the operating bandwidth may span at least one micron, although it should be appreciated that the operating bandwidth may span a smaller range (e.g., such as 50 nanometers, 100 nanometers, 400 nanometers, or the like). In these examples, it is possible for an operating bandwidth of the light splitting device 100 that spans one micron may be accomplished even though the first and second couplers 115, 130 each have an operating bandwidth that is narrower than one micron.

The light inputs 105a, 105b emit input light along light paths 110a, 110b to the first coupler 115. The light inputs 105a, 105b may emit light along light paths 110a, 110b that is received by the first coupler 115. In some examples, the light inputs 105a, 105b may receive light from any type of suitable light source including any coherent or semi-coherent light source, or any combination thereof. The light sources may emit a single wavelength of light or may be configured as a tunable light source that may emit across a range of wavelengths of light, for example 15 nanometers although other tunable light sources may have different ranges that may be greater than or less than 15 nanometers. Additionally, any number of light sources may be employed in the light splitting device 100.

Generally, the light inputs 105a, 105b may be implemented via waveguides of a photonics integrated circuit, however, the light splitting device may be integrated into a larger optical system that may also employ optical fibers, free space optics, and so forth, to route light at different points within the larger optical system. The light paths 110a, 110b may represent waveguides, optical fibers, free space optics, or other elements or media through which light travels. Preferably, such as in the embodiment of FIG. 1, the light paths 110a, 110b are waveguides though alternatives to waveguides (e.g., light propagating through a medium such as air or polysilicon between devices) may be used in the larger optical system for coupling light into the first coupler 115. The first light input 105a may emit a first wavelength of light on light path 110a and the second light input 105b may emit a second wavelength of light on light path 110b.

As described herein with reference to FIGS. 1-4, the first coupler and the second coupler are two-by-two couplers. The first input of the first coupler 115 may receive a first input of light along light path 110a and the second input of the first coupler 115 may receive a second input of light along light path 110b, thus the first coupler 115 will function to split light received by a single input (e.g., light received from either input). Although the first coupler 115 may be described as receiving a first and second input of light, in other embodiments, the first coupler 115 may receive light on only the first input or only the second input. In the example of receiving a single input of light, the first coupler 115 may be a one-by-two coupler. The first coupler 115 may combine and split the light on the first output via the light path 120a and on the second output via the light path 120b of the first coupler 115. Splitting the output light between the first and second outputs may be wavelength dependent. For example, the optical power of the output light may be split evenly when the wavelengths emitted by the light inputs 105a, 105b are within the intended operating bandwidth of the first coupler 115. For a particular wavelength, the optical power of the first output light may split 90 percent of the optical power on the first output and ten percent of the optical power on the second output for some wavelengths that are shorter than the intended operating bandwidth of the first coupler 115. Further, the optical power of the output light may split 10 percent of the optical power on the first output and 90 percent of the optical power on the second output for some wavelengths that are longer than the intended operating bandwidth of the first coupler 115. Although this specific example describes the functionality of the outputs for a couple of particular wavelengths, generally for shorter and longer wavelengths outside the intended operating bandwidth the outputs of the individual first and second couplers 115, 130 may output largely asymmetrical optical power. Additionally, there are crossover wavelengths for which the first coupler 115 and the second coupler 130 may evenly split optical power between the outputs.

The phase delay 125 may be positioned between the first coupler 115 and the second coupler 130. Although the phase delay 125 is illustrated in FIG. 1 is introduced on the light path 120b, this is for discussion purposes only and the phase delay may be introduced (e.g., positioned) on either of the light paths 120a or 120b. The phase delay 125 may phase shift the light received from the first coupler 115 and passed to the second coupler 130. The phase delay 125 may reduce or eliminate any phase delay between the output light from the first and second outputs of the first coupler 115. In some examples, the phase delay may be one micron or less between the output light from the first and second outputs of the first coupler 115. The phase delay 125 may ensure that the outputs may have the same or similar optical power across the operating bandwidth of wavelengths of the light splitting device 100. That is, the delay introduced by the phase delay 125 may result in a more even distribution of optical power across the operating bandwidth of wavelengths of the light splitting device 100. Although the distribution may still have variations across wavelengths, the phase delay 125 may reduce these variations. To achieve this delay, the phase delay 125 may be a variable phase delay, a fixed phase delay, or any suitable phase delay that reduces the variation in the power distribution across the operating bandwidth of wavelengths.

The light on the light path 120a may pass to the first input of the second coupler 130, the phase delay 125 may pass light to the second input of the second coupler 130, and the second coupler 130 may pass the output light via light paths 135a, 135b. Similar to the first coupler 115, the second coupler 130 may be a two-by-two coupler. In FIG. 1, the second splitting power relationship of the second coupler 130 may be complementary to the first splitting power relationship of the first coupler 115, as the inversely proportional splitting power relationships of the first coupler 115 and the second coupler 130 may have an inversely proportional wavelength/optical power relationship (e.g., splitting power relationship) to one another. The term "complementary" will be described in further detail herein with reference to FIGS. 2A, 2B, and 2C.

For example, the second coupler 130 may output light with an optical power that is evenly distributed (e.g., similar or the same optical power on both the outputs of the second coupler 130) within the intended operating bandwidth of the second coupler 130. The optical power of the second coupler 130 may split 10 percent of the optical power on the first output of the second coupler and 90 percent of the power optical on the second output of the second coupler 130 for some wavelengths that are shorter than the intended operating bandwidth of the second coupler 130. That is, the second coupler 130 may unevenly distribute the light in the opposite direction from the first coupler 115 (e.g., the first coupler 115 outputs optical power with 90 percent on the first output and the second coupler 130 outputs optical power with ten percent on the third output for the same or similar wavelengths that are shorter than the intended operating bandwidths of the first and second couplers 115, 130). Additionally, the optical power of the output light may split 90 percent of the optical power on the first output and ten percent of the optical power on the second output for some wavelengths that are longer than the intended operating bandwidth of the second coupler 130. Again, as previously described, the values of the power splitting ratios described immediately above are used for explanatory purposes only.

Figure 2A:
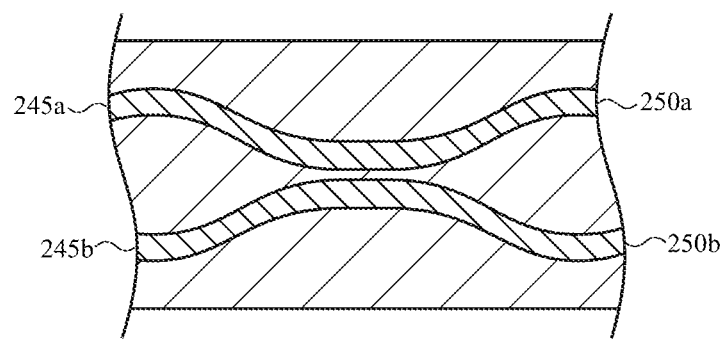
FIG. 2A is an example of a first coupler with example optical power distributions on the outputs.
Figure 2B:
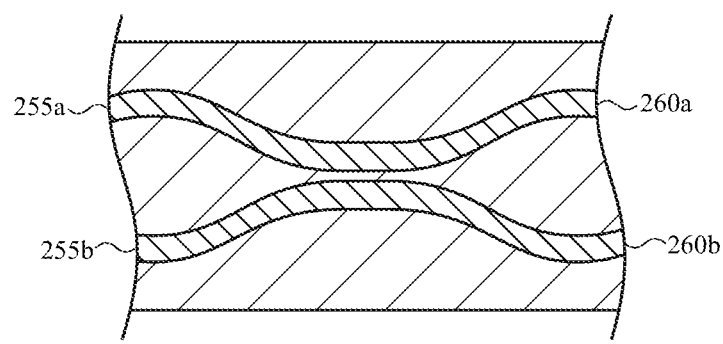
FIG. 2B is an example of a second coupler with example optical power distributions that are complementary to the first coupler of FIG. 2A.

FIG. 2A is an example of a first coupler 215 with example optical power distributions on the outputs and FIG. 2B is an example of a second coupler 230 with example optical power distributions that are complementary to the first coupler of FIG. 2A. The first and second couplers described with reference to FIGS. 2A and 2B each have a inversely proportional splitting power relationship between the input wavelength and the optical power splitting ratio between the outputs that may be said to be complementary. The term complementary will be described in further detail with reference to FIGS. 2C-2E. The first and second couplers that provide this flattened wavelength dependence may be said to be "complementary" as the first coupler may have a splitting power relationship with a positive slope for output optical power and the second coupler may have a splitting power relationship with a negative slope for output optical power (or vice versa).

The splitting power relationship of the wavelength/optical power splitting ratio for the first and second couplers of FIGS. 2A and 2B may have approximately inversely proportional splitting power relationships over the wavelength operating bandwidth of interest for the light splitting device (e.g., the first splitting power relationship has a positive slope as a function of wavelength and the second splitting power relationship has a negative slope as a function of wavelength). The first and second couplers of FIGS. 2A and 2B are examples of the first and second couplers of FIG. 1 and may function as part of the light splitting device 100. The function of the first coupler 215 may exhibit a splitting power relationship between the input wavelength and the optical power splitting ratio of the outputs. Similarly, the second coupler 230 (described in FIG. 2B) may also exhibit a splitting power relationship between the input wavelength and the optical power splitting ratio of the outputs, but the second coupler 230 may have a complementary splitting power relationship to the first coupler 215 (e.g., the splitting power relationship of the second coupler 230 may have an approximately inverse relationship to the splitting power relationship of the first coupler 215) as will be described herein with reference to FIGS. 2A-2E. Further, the first and second couplers (e.g., together in the light splitting device) generally may exhibit complementary optical power splitting ratios as will be described herein with reference to FIGS. 2C-2E.

In FIG. 2A, the first coupler 215 may receive a wavelength $\lambda 1$ of light at one or both of the first and second inputs 245a, 245b. Because the wavelength $\lambda_1$ is outside the operating bandwidth of the first coupler 215, the optical power distribution may be unevenly split at the outputs. As an example, the first output 250a of the first coupler 215 may output 90% of the optical power and the second output 250b of the first coupler may output ten percent of the optical power (or split according to another ratio outside of the desired splitting ratio). The first and second outputs 250a, 250b may be received by the second coupler 230. It should be understood that the phase delay has been omitted from the discussion of FIGS. 2A and 2B for ease of discussion, but may be positioned between the first and second couplers 215, 230 as shown in FIG. 1. In FIG. 2B, the second coupler 230 receives 90% of optical power on the third input 255a, and 10% of the optical power on the fourth input 255b. Because the second coupler 230 is complementary to the first coupler 215, the optical power at the third output 260a and the fourth output 260b may be closer to an even optical power distribution between the third and fourth outputs 260a, 260b. For example, the third output 260a of FIG. 2B will provide further detailed explanation of the wavelength/optical power splitting ratio for complementary outputs.

Figure 2C:
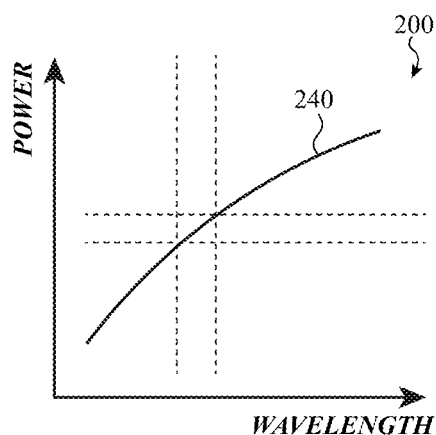
FIG. 2C is a graph showing example output signals from a first two-by-two coupler of an example light splitting device.

FIG. 2C is a graph showing example output signals from an output of the first coupler of an example light splitting device. The graph 200 of FIG. 2C illustrates an example curve 240 of the splitting power relationship between the output optical power (e.g., y-axis) as a function of wavelength (e.g., x-axis). As shown, the curve 240 generally has a "positive" slope, such that the optical power outputted by one of the outputs of the first coupler increases as the input wavelength increases. As previously described, the splitting power relationship between wavelength and the optical power may be approximately linear. The output signals from one of the outputs of the first coupler may be transmitted to one of the inputs of the second coupler input. Although FIGS. 2A-2E discuss output signals of a single arm of the first coupler and a corresponding single arm of the second coupler, it may be understood that the first coupler and the second coupler each have two inputs and two outputs as described with reference to FIGS. 3 and 4. Furthermore regarding FIGS. 2C-2E, the wavelength (e.g., x-axis) and the power (e.g., y-axis) have arbitrary units as the graph 200 and the curve 240 are used for explanatory purposes only and illustrate an approximate representation of the splitting power relationship between the output optical power as a function of wavelength from one leg of a first coupler.

Figure 2D:
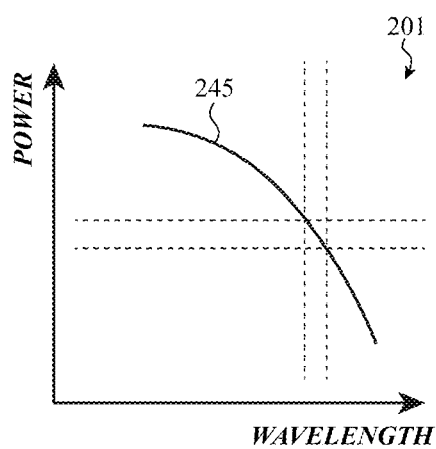
FIG. 2D is a graph showing example output signals from a second two-by-two coupler of an example light splitting device.

FIG. 2D is a graph showing example output signals from an output of the second coupler of an example light splitting device. The graph 201 of FIG. 2D illustrates an example curve 245 of the relationship between the output optical power (e.g., y-axis) as a function of wavelength (e.g., x-axis). As shown, the curve 245 generally has a "negative"

slope, such that the optical power outputted by one of the outputs of the second coupler decreases as the input wavelength increases.

Figure 2E:
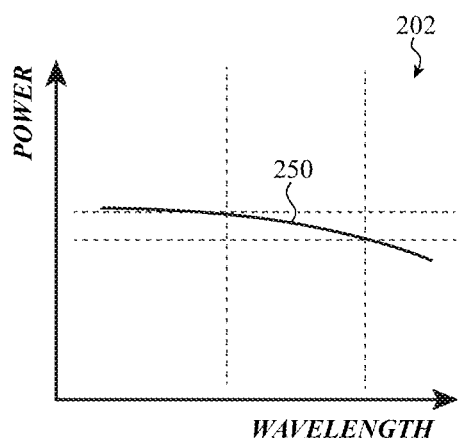
FIG. 2E is a graph showing example output signals from the light splitting device using the first and second two-by-two couplers of FIGS. 2A and 2B

FIG. 2E is a graph showing example output signals from an output of the light splitting device using the first and second couplers described with reference to FIGS. 2A-2D. The graph 202 of FIG. 2E illustrates an example curve 250 of the relationship between the output optical power (e.g., y-axis) as a function of wavelength (e.g., x-axis) exhibited by the output of the light splitting device. As shown, the curve 250 generally has a "flat" slope, such that the optical power outputted by one of the outputs of the light splitting device remains flatter across the operating bandwidth of wavelengths. Put another way, the optical power output is approximately the same across the operating bandwidth of wavelengths, thus decreasing the wavelength dependence of the light splitting device.

Figure 3:
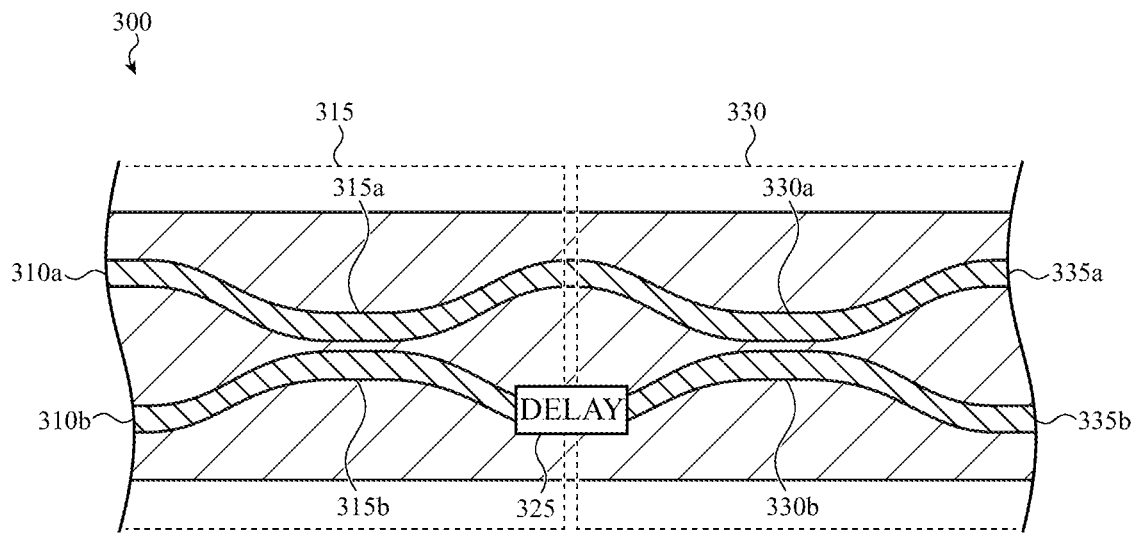
FIG. 3 is an example directional light splitting device with cascaded directional two-by-two couplers.

FIG. 3 is an example directional light splitting device with directional couplers. The directional light splitting device 300 includes a first directional coupler 315, a phase delay 325, and a second directional coupler 330. The first directional coupler 315 includes a first leg 315a and a second leg 315b. Similarly, the second directional coupler 330 includes a third leg 330a and a fourth leg 330b with outputs 335a, 335b, respectively. As previously described with reference to FIGS. 1-2E, the light splitting device 300 may function over a wider operating bandwidth of wavelengths (e.g., broadband wavelengths) than each of the individual first and second directional couplers 315, 330. Although other devices may exist that function over a similar operating bandwidth, these devices tend to be large (e.g. approximately 3.5-5 millimeters or larger). The directional light splitting device 300 may be a compact device capable of efficiently functioning over a defined operating bandwidth (in some instances spanning a micron or more) while maintaining a small form factor (e.g., approximately less than 2.5 mm).

The first and second directional couplers 315, 330 may be selected because the first directional coupler 315 is complementary to the second directional coupler 330. As previously described with reference to FIGS. 2A-2E, first directional coupler 315 may have a splitting power relationship with a positive slope for output optical power and the second directional coupler 330 may have a splitting power relationship with a negative slope for output optical power. It may be understood that the either one of the directional couplers may have a positive slope as long as the other directional coupler has a wavelength relationship with a negative slope for output optical power. Because of the complementary splitting power relationship between the first and second directional couplers 315, 330, the light splitting device 300 may function over a wider operating bandwidth than either of the individual first or second directional couplers 315, 330. It is the approximately inverse splitting power relationship of the first and second directional couplers 315, 330 that allow the light splitting device 300 to function over the wider operating bandwidth while maintaining a compact form factor. That is, each of the first and second directional couplers 315, 330 may individually be designed to efficiently couple light over a first operating bandwidth, but when optically coupled together in a light splitting device 300 efficiently function over a wider wavelength operating bandwidth.

The first directional coupler 315 has a first leg 315a and a second leg 315b. The first leg 315a has a first input 310a and the second leg 315b has a second input 310b. The first and second inputs 310a, 310b may receive light directly from light sources or via light paths (e.g., waveguides or any suitable light transmitting medium). The received light at a given time may be one or more wavelengths, but generally may be over a broadband operating bandwidth of wavelengths. Additionally, the first and second legs 315a, 315b of the first directional coupler 315 are depicted as consistent widths, but the widths of the first and second legs 315a, 315b may vary so long as the functionality and form factor of the first directional coupler 315 remain similar or the same.

As shown, the first leg 315a and the second leg 315b may be spaced far enough apart from one another that light coupling between the first and second legs 315a, 315b may not occur. The first and second legs 315a, 315b may curve so that in a central location (e.g., first coupling area), the light propagating through the first leg 315a may optically couple to the second leg 315b and/or vice versa. Through the first coupling area, the first and second legs 315a, 315b may be separated from one another by a gap. The gap is depicted as a constant width in FIG. 3, but may be a varying width (e.g., the width may widen or grow narrower as the light propagates through the first and second legs 315a, 315b) in other embodiments, so long as the coupling between the first and second legs 315a, 315b is the same or similar as when the gap is a constant width.

The light may continue to propagate through the device as the first and second legs 315a, 315b separate from one another. As the first and second legs 315a, 315b are separated by a larger gap, the coupling between the first and second legs 315a, 315b may decrease. At the outputs of the first directional coupler 315, the first and second legs 315a, 315b are not optically coupled to one another. The coupled light may then be output by the first directional coupler 315. As shown in FIG. 3, the light output from the second leg 315b may be passed to the phase delay 325.

The light splitting device 300 also includes a phase delay 325. The phase delay 325 may be positioned on one of the first or second legs of the first and second directional couplers 315, 330. As shown, the phase delay 325 is positioned between the first and second directional couplers 315, 330 and on the second leg 315b of the first directional coupler 315 and the second leg 320b of the second directional coupler 330, but the phase delay 325 may be positioned on the first leg as well. Generally, the phase delay 325 is positioned within the light splitting device 300 so that the leg on which it is positioned is not optically coupled to the other leg of the same directional coupler of the light splitting device 300.

The phase delay 325 may shift the phase of light and may be at least partially dependent on the complementary splitting power relationship of the first and second directional couplers 315, 330. The phase shift of the light that passes through the phase delay 325 may assist in generating an even distribution of optical power from the second directional coupler 330 over the operating bandwidth of interest. That is, the phase delay 325 functions to remove the variation of the optical power distribution over the operating bandwidth of broadband wavelengths. Because the phases of the light propagating through the directional light splitting device 300 affect the amplitude of the light propagating through the directional light splitting device 300, the phase shift also affects the optical power output distribution. It may be understood that the propagating light may be represented as a generally sinusoidal wave and the light couples between the respective legs of the first and second directional couplers 315, 330 as it passes through the light splitting device 300. The light may pass from the phase delay 325 and to a third leg 330a of the second directional coupler 330.

As previously described, the second directional coupler 330 may be complementary to the first directional coupler 315 and similarly may have two legs, third and fourth legs 330a and 330b. The third leg 330a may receive the light from the first leg 315a directly as the first and second directional couplers 315, 330 may be abutted such that the light may propagate directly from the first leg 315a of the first directional coupler to the third leg 330a. In other examples, the first and second directional couplers 315, 330 may be adjacent to one another or may be separated from one another by a suitable light coupling medium, so long as the light may efficiently pass from the first directional coupler 315 to the second directional coupler 330 with low optical loss (e.g., less than five percent loss). The light may propagate through the second directional coupler 330 and may be output at the third output 335a and fourth output 335b. The output light from each of the third and fourth outputs 335a, 335b may have an even distribution over a broadband wavelength operating bandwidth. It may be understood that although the term "even distribution" may be used herein, that the distribution between the third and fourth outputs 335a, 335b of the second directional coupler 330 may be said to be "even" if it's within a specified tolerance (e.g., the two optical power outputs are within 20 percent of one another). For example, the optical power distribution may be 40 percent on the third arm 335a and 60 percent on the fourth arm 335b of the second directional coupler.

Figure 4:
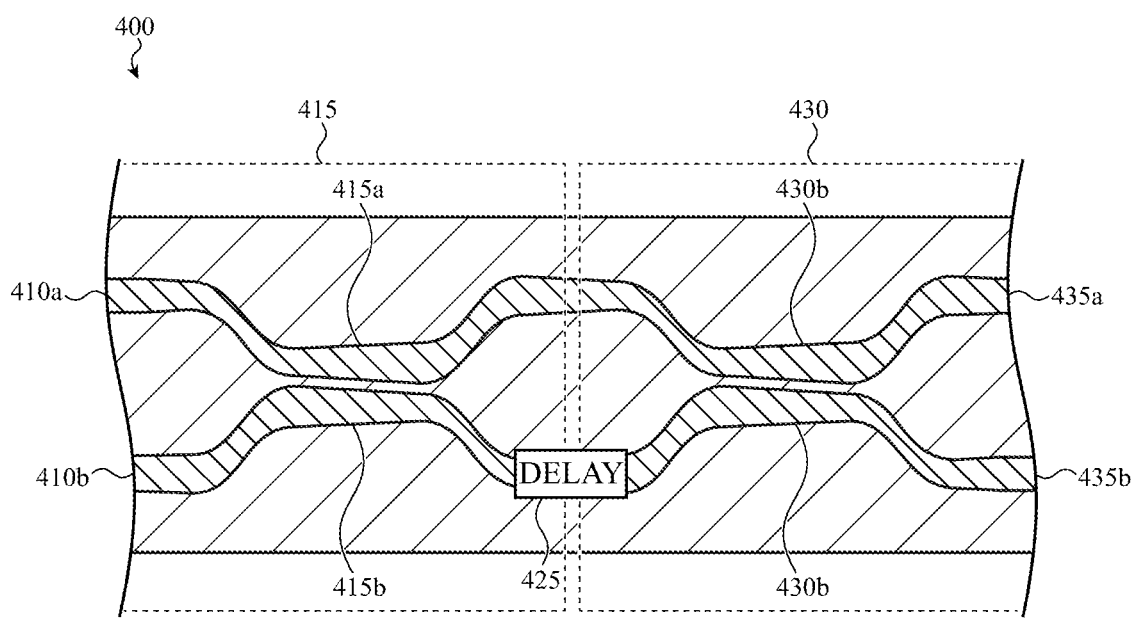
FIG. 4 is an example tapered light splitting device with cascaded tapered two-by-two couplers.

FIG. 4 is an example tapered light splitting device with tapered couplers. The tapered light splitting device 400 includes a first tapered coupler 415, a phase delay 425, and a second tapered coupler 430. The first tapered coupler 415 includes a first leg 415a and a second leg 415b and the second tapered coupler 430 includes a third leg 430a and a fourth leg 430b. As previously described with reference to FIGS. 1-2E, the light splitting device 400 may function over a wider operating bandwidth of wavelengths (e.g., broadband wavelengths) than each of the individual first and second tapered couplers 415, 430. Due to the similarity of the directional light splitting device 300 of FIG. 3 and the tapered light splitting device 400 of FIG. 4, only the primary difference will be described with reference to FIG. 4.

The tapered coupler 415 includes the first leg 415a and the second leg 415b. The first and second legs 415a, 415b may be spaced apart from one another at the first and second inputs 410a, 410b, and move closer to one another as the first and second legs 415a, 415b approach the first coupling region. The first and second legs 415a, 415b may have consistent widths where the legs are straight and may become narrower as the first and second legs 415a, 415b become closer to one another. In other embodiments, the first and second legs 415a, 415b may have varied widths so long as the light may similarly propagate through the first and second legs 415a, 415b without causing any appreciable optical differences in the propagating light (e.g., the light doesn't generate any undesirable modes, no undesirable optical loss, and so forth).

As shown in FIG. 4, the first and second legs 415a, 415b may taper in the first coupling area (e.g., where the first and second legs 415a, 415b are optically coupled to one another). The first and second legs 415a, 415b may change in width as light propagates through the first coupling area. The first leg 415a may be narrower and may taper to a wider width and the second leg 415b may be wider than the first leg 415a at the start of the coupling area and then become narrower. It may be understood that either of the first and second legs 415a, 415b may start wide or narrow as long as the adiabatic taper is maintained throughout the first coupling area. Put another way, the first leg 415a and the second leg 415b may be inversely tapered in the coupling area. In the first coupling area of the first tapered coupler 415, light may couple from the first leg 415a, to the second leg 415b, and vice versa. Because the first and second legs 415a, 415b are slowly tapered, the light may adiabatically couple between the first and second legs 415a, 415b.

The tapering of the first and second tapered couplers 415, 430 may be used for output optical power equalization, but may depend on the tradeoff with the phase separation between the respective legs of the first and second couplers 415, 430. Additionally, The taper lengths of the tapers in the first and second coupling areas of the first and second tapered couplers 415, 430, respectively, may achieve the phase separation and the power equalization between the first and second couplers 415, 430 over the operating bandwidth with the assistance of the phase delay 425. Further, the taper lengths of the first and second couplers 415, 430 in the first and second coupling areas may be a primary design consideration; however, the first and second coupler widths are accounted for to provide the desired light coupling between the respective legs of the first and second couplers 415, 430.

Although tapered waveguides may be used for adiabatically coupling light between waveguides, it is understood that the longer and slower the taper of the waveguide, the better the performance of the device. By using first and second tapered couplers 415, 430, that are complementary to one another, the inverse functionality over wavelength allows the tapered light splitting device 400 to maintain an overall compact form function (e.g., less than two millimeters) while efficiently functioning over a broadband operating wavelength range.

Although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A light splitting device, comprising:
a first coupler that couples light over an operating bandwidth of wavelengths that spans at least 1 micron, comprising:
   a first leg of the first coupler comprising a first input; and
   a second leg of the first coupler optically coupled to the first leg of the first coupler;
a second coupler that couples light over the operating bandwidth of wavelengths, comprising:
   a first leg of the second coupler comprising a first output; and
   a second leg of the second coupler optically coupled to the first leg of the second coupler and comprising a second output; and
a fixed phase delay positioned between the first coupler and the second coupler, wherein:
the first and second couplers are tapered couplers;
the first coupler has a first splitting power relationship;
the second coupler has a second splitting power relationship;
the first coupler and the second coupler have complementary splitting power relationships over the operating bandwidth of wavelength; and
the light splitting device is configured to receive light within the operating bandwidth of wavelengths received at the first input and split the received light between the first output and the second output.

2. The light splitting device of claim 1, wherein the first coupler and the second coupler are each narrowband couplers.

3. The light splitting device of claim 1, wherein:
the first coupler comprises a first coupling area;
the first and second legs of the first coupler are tapered in the first coupling area;
the second coupler comprises a second coupling area; and
the first and second legs of the second coupler are tapered in the second coupling area.

4. The light splitting device of claim 3, wherein:
the first coupler is adiabatically tapered in the first coupling area; and
the second coupler is adiabatically tapered in the second coupling area.

5. A light splitting device, comprising:
a first coupler for coupling light with a first splitting power relationship between wavelengths of light and output optical power, comprising:
   a first leg of the first coupler; and
   a second leg of the first coupler positioned so that the light couples between the second leg and the first leg;
a second coupler for coupling light with a second splitting power relationship between wavelengths of light and output optical power, comprising:
   a first leg of the second coupler; and
   a second leg of the second coupler positioned so that the light couples between the first leg of the second coupler and the second leg of the second coupler; and
a fixed phase delay positioned between the second leg of the first coupler and second leg of the second coupler, wherein:
the first and second couplers are directional couplers;
the first and second splitting power relationships between the wavelengths of light and the output optical power are inversely proportional across a bandwidth of wavelengths that spans at least 1 micron; and
the light splitting device is configured to receive light within the bandwidth of wavelengths received at the first leg of the first coupler and split the received light between the first leg and the second leg of the second coupler.

6. The light splitting device of claim 5, wherein:
the first splitting power relationship between the wavelengths of light and the output optical power is represented by a positive slope;
the second splitting power relationship between the wavelengths of light and the output optical power is represented by a negative slope; and
the light splitting device has a third splitting power relationship between the wavelengths of light and the output optical power that is represented by a flattened slope when compared to the positive slope and the negative slope.

7. The light splitting device of claim 5, wherein:
the first coupler and the second coupler couple light over a first operating bandwidth of wavelengths; and
the light splitting device couples light over a second operating bandwidth of wavelengths, wherein the first operating bandwidth of wavelengths is narrower than the second operating bandwidth of wavelengths.

8. The light splitting device of claim 7, wherein the first and second legs of the second coupler output an even optical power distribution over the second operating bandwidth of wavelengths.

9. The light splitting device of claim 8, wherein the even optical power distribution depends at least partially on the phase delay.

10. A method for splitting light, comprising:
inputting a first input light to a first coupler;
splitting the first input light into a first output light and a second output light by the first coupler;
outputting the first and second output light from the first coupler;
delaying a phase of the second output light by a fixed amount;
receiving the first output light and the phase delayed second output light by a second coupler; and
outputting a first and a second output light from the second coupler, wherein:
the first coupler and the second coupler are tapered couplers;
the first input light inputted to the first coupler is within an operating bandwidth of wavelengths that spans at least 1 micron; and
the first coupler has a first splitting power relationship;
the second coupler has a second splitting power relationship; and
the first and second splitting power relationships are complementary across the operating bandwidth of wavelengths.

11. A light splitting device, comprising:
a first coupler that couples light over an operating bandwidth of wavelengths that spans at least 1 micron, comprising:
   a first leg of the first coupler comprising a first input; and
   a second leg of the first coupler optically coupled to the first leg of the first coupler;
a second coupler that couples light over the operating bandwidth of wavelengths, comprising:
   a first leg of the second coupler comprising a first output; and a second leg of the second coupler optically coupled to the first leg of the second coupler and comprising a second output; and a fixed phase delay positioned between the first coupler and the second coupler, wherein:

the first and second couplers are directional couplers;

the first coupler has a first splitting power relationship;

the second coupler has a second splitting power relationship;

the first coupler and the second coupler have complementary splitting power relationships over the operating bandwidth of wavelength; and the light splitting device is configured to receive light within the operating bandwidth of wavelengths received at the first input and split the received light between the first output and the second output.

\* \* \* \* \*